VIDEO GATING SYSTEM

Filed March 3, 1967 3 Sheets-Sheet 1

INVENTOR.
DAVID M. STERN
BY Thomas P. Murphy
ATTORNEY

VIDEO GATING SYSTEM

Filed March 3, 1967

3 Sheets-Sheet 2

INVENTOR.
DAVID M. STERN
BY Thomas P. Murphy
ATTORNEY

INVENTOR.
DAVID M. STERN
BY Thomas P. Murphy
ATTORNEY

United States Patent Office 3,560,929

Patented Feb. 2, 1971

3,560,929

VIDEO GATING SYSTEM

David M. Stern, Merion Station, Pa., assignor to Burroughs Corporation, Detroit, Mich., a corporation of Michigan Filed Mar. 3, 1967, Ser. No. 620,545
Int. Cl. G06k 9/04
U.S. Cl. 340—146.3 19 Claims

ABSTRACT OF THE DISCLOSURE

A video gating system for use in a character recognition system for gating a portion of the video associated with each character to be identified. A print edge detector selects a 20 row sub-set out of 30 rows into which each scan of a character is arbitrarily divided. The sub-set is selected by determining the row located three rows below the first of the two adjacent rows containing black video information. The selected row is encoded as a number and compared to the output of a counter. When the number equals the output of the counter, a gate is opened for each scan for the time it takes 20 rows of data to pass through into the recognition logic. Delay means between the video and the gate are provided to delay the video associated with a particular character from passing through until the appropriate window has been prepared.

This invention relates to a video gating circuit and more particularly, to a video gating circuit for minimizing the amount of data associated with a scanned character which must be processed by the recognition logic of a character recognition apparatus.

In many character recognition systems which employ an optical scanning technique a plurality of vertical scans are made for each character. Each scan to be read provides black and white video information which together with the information obtained by virtue of the other scans associated with a character ultimately defines the character. However, much of the video processed in the recognition logic contains no significant information. This is so because the scan has a length which is normally substantially greater than the height of the scanned character. Therefore, the background video produced by the scan above and/or below the character contains little usable information. The reason why the scan has such a length is to accommodate changes of character position within a print line, e.g., characters out of alignment and also changes in character position due to print line tilt. Thus, in character recognition systems it is desirable that the scan length must be long enough to include within the scan more than just the height of the character.

Nevertheless, the resultant excess background video places an unnecessary burden on the recognition processing apparatus. If this unnecessary burden is substantially lessened, it is clear that the complexity of the recognition logic system can be correspondingly decreased with obvious substantial saving in amount and therefore cost of apparatus used.

Therefore, the purpose of the present invention is to provide a system for gating out from the recognition logic of a character recognition system substantially all the excess background video. In other words, the present invention utilizes an arrangement wherein a gate or window to the recognition logic is provided for the video caused by that portion of the scan associated with an individual character which contains the black and white information necessary for identification of the character.

In carrying out the present invention each set of scans is arbitrarily divided into 30 rows from which a 20 row sub-set of video data is selected for application to the recognition logic. The scan that detects the lowest edge of a character is determinative of the 20 row sub-set to be selected for all of the scans associated with each character. Depending on the position of the character within the scan matrix, the particular sub-set or window of 20 rows out of a possible 30 rows may vary for each individual character thereby assuring that line tilt or character misalignment within the print line does not result in incomplete information being fed into the recognition logic.

More specifically, the present invention comprises a video gating system including a print edge detector which detects and records the lowest two adjacent rows in a character matrix which contain black information as distinguished from background as white information. The sub-set or window is selected by determining the row located three rows below the first of the two adjacent rows containing black (or more generally dark) information. The selected row is encoded as a binary number which is compared to the output of a counter which runs synchronously with each scan cycle. When the binary number equals the output of the counter, a gate for the video is opened for the time it takes 20 rows of data in a scan to pass through into the recognition logic. The gate is opened for the same sub-set of 20 rows for each of the scans associated with a character. Delay means are provided between the video and the gate to delay the video associated with a particular character from passing through the gate until its appropriate window has been prepared. Control means are also provided to change the selected 20 row sub-set at a time correspondnig to the end of a character to accommodate print line tilt or misaligned characters.

It is an object of the present invention to provide an apparatus which gates to the recognition logic of a character recognition system only a selected portion of the video associated with each character.

Another object of the present invention is to provide an apparatus for use in a character recognition system which prevents substantially all of the background information due to scanning above and below the character from entering the recognition logic for processing.

A further object of the present invention is to provide an apparatus for selecting a 20 row sub-set or window from a 30 row read scan associated with each character changeable with each character or at other predetermined times to accommodate line tilt or individual character misalignment.

Other objects and many of the attendant advantages of the present invention will become apparent with the reading of the following description in conjunction with the drawings wherein.

Figure 1:
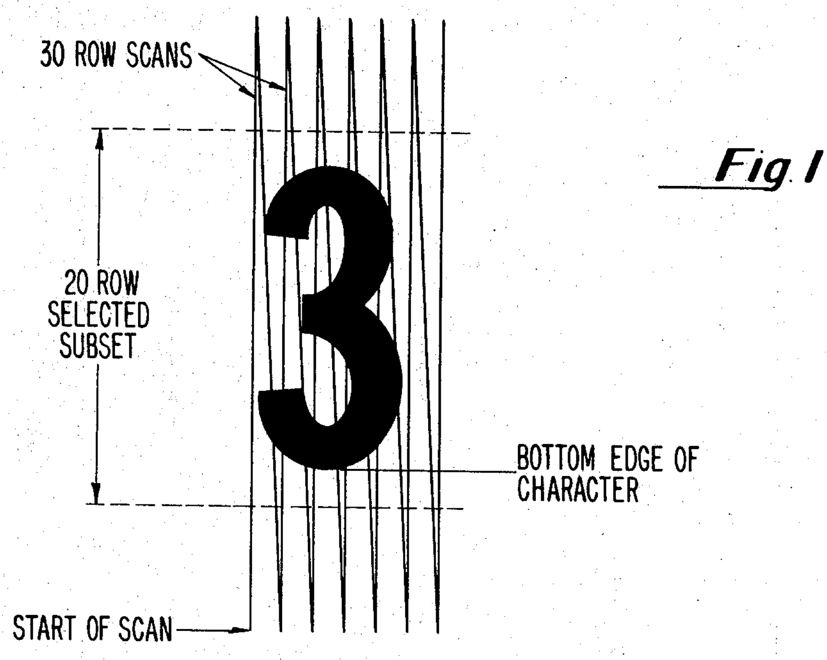
FIG. 1 illustrates a scan field associated with a single character useful in understanding the present invention.

As shown in FIG. 1 the serial video information obtained from a set of vertical scans is assumed to represent the scanned character as an array of light and dark points within a matrix arbitrarily chosen to be 30 rows high. From this matrix a 20 row sub-set, containing the information defining the scanned character, is selected for application to the recognition circuitry. This 20 row subset adequately contains the scanned character because either the 30 row matrix was made large enough to accommodate all possible forms of the system input data or the data has been normalized in a manner such that it always appears to this gating system to be of essentially constant height and less than 20 rows high. Since the means of assuring that the scanned character data can be accommodated by the matrix sub-set employed by the recognition system is not pertinent to the present invention, it is to be understood that for the purpose of the following description the input data is always appropriately normalized (to a height of 14 rows). The selected matrix sub-set chosen for processing through the recognition circuitry may be selected on the basis of the location of an upper or lower edge of the character. For the particular embodiment discussed hereinafter the lower edge of each character is used to define the data position within the 30 row matrix.

Figure 2:
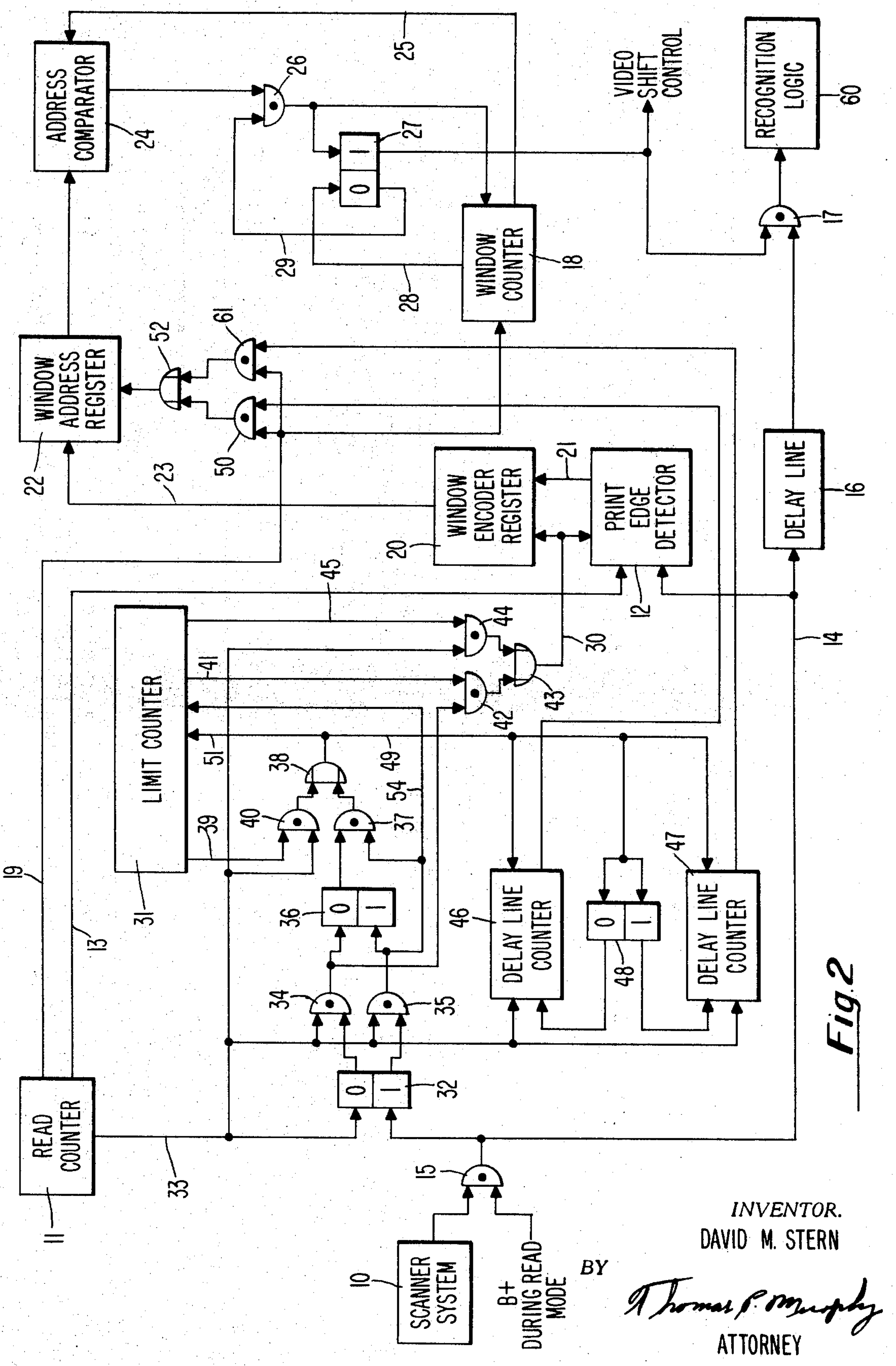
FIG. 2 illustrates in block diagram form, a preferred embodiment of the present invention.

Referring now more particularly to FIG. 2 there is shown a preferred embodiment of the present invention. The present invention comprises a read counter 11 which counts from 0 to 31 during each read scan and recycles. A scan counter (not shown) may be utilized for synchronizing each cycle of the read counter 11 with the start of a scan. The read counter 11 is conventional and may comprise a 5-bit binary counter. The output of the read counter 11 is provided as an input to a print edge detector 12 over conductor 13. In this sense the read counter acts as a signal source providing a control signal at each count. The print edge detector 12 is a register comprising fourteen flip-flops initially set to the zero state. A second input via conductor 14 provides the print edge detector 12 with serial binary "ONE" and "ZERO" information representative, respectively, of dark and light video information originating in an optical scanning apparatus of a type used in a typical character recognition system. Since it may be desired to provide the print edge detector 12 with video information only during read mode operation of the overall system, an AND gate 15 having an output terminal connected to the conductor 14 may be utilized. One input to the AND gate 15 is provided by the optical scanner system 10 and provides the AND gate 15 with binary video information for each scan of a preselected area of a document. The scanner system 10 which may be a conventional type such as a flying spot scanner provides the AND gate 15 with a "ONE" or positive voltage when dark information, that is, ink is encountered during a scan and a "ZERO" or zero voltage when light information is detected. The other input to the AND gate 15 is present, i.e., true whenever the overall system is in the read-scan mode and may be provided in any desired conventional manner (not shown).

The input which the print edge detector 12 receives from the read counter 11 is in effect a series of enabling pulses enabling in sequence the input gate on each of the 14 flip-flops comprising the print edge detector register 12. Whenever a video black signal is provided by the optical scanning system, the AND gate 15 provides a true signal level to the print edge detector 12 on line 14. If a video black or dark signal occurs during any of the first fourteen counts of the read counter 11 during any given scan of the system, the corresponding one of the fourteen flip-flops contained in the print edge detector 12 is set to the "ONE" state. The criteria used for selecting the window in the scan data is to select the lowest window wherein two adjacent rows containing dark information are encountered. The bottom of the window is then determined to be located three rows below the first of the adjacent rows containing the dark information. The top of the window is located twenty rows or counts up the scan line. The lowest two adjacent flip-flops in the print detector 12 which are set to the "ONE" state during any one of the scans associated with a character determines the lowest pair of adjacent rows which contain black information.

The conductor 14 provides the video information to a delay line 16. The delay line 16 may be a magnetostrictive delay line providing a delay of 1,664 microseconds which correspond exactly to the time of thirteen scans which represent the number of scans that are required to encompass two successive minimum width characters that are separated by a minimum gap. The output of the delay line 16 provides one of the inputs to an AND gate 17. The other input to the AND gate 17 gates the binary video from the delay line 16 over the selected portion (the window) of each read scan. A selected twenty row sub-set out of a possible thirty row scan is permitted to pass through the AND gate 17 for application to the recognition logic circuitry 60.

A window counter 18 counts at the element scan rate and is capable of counting from 0 to 31. The window counter 18 is connected to the read counter 11 via a conductor 19 over which the read counter 11 provides the window counter 18 with a synchronizing pulse each time the read counter 11 reaches a count of thirty. Therefore, the window counter 18 is synchronized once each cycle with the read counter 11. During the time when scan data defining a character is entered into the delay line 16, the flip-flops in the edge detector register 12 are set to the "ONE" state to permit determination for each successive character the lowest two adjacent rows of the first 14 rows of the 30 row scan which contain dark information.

At a time corresponding to the end of a character, a window encoder register 20 encodes information received from the edge detector register 12 via conductors indicated schematically by line 21. The encoder register 20 stores the encoded position of the bottom row or line of the selected window as a binary address for insertion into a window address register 22 via a conductor 23. The time at which, and the manner in which the information contained in the print edge detector 12 is transferred to the encoder register 20 for storage and thence to the address register 22 is discussed more fully hereinbelow. In any event, the binary number contained in the address register 22 represents the number of the row of the thirty row scan matrix which corresponds to the bottom row of the selected window. The binary number contained in the window address register 22 is presented as an input to an address comparator 24. The address comparator 24 receives its second input from the window counter 18 via conductor 25, it being remembered that the window counter 18 being initially synchronized with the read counter 11 counts in synchronism with the data scans. The address comparator 24 may be of any well-known type which provides an output when the binary number contained in the address register 22 is equalized by the count provided from the window counter 18.

The output indicative of the aforementioned condition of equality is provided by means of an AND gate 26 as an input pulse to the window counter 18 which resets the window counter 18. The window counter 18 then commences to count to nineteen to define the upper edge of the window. The window counter 18 is reset for the next cycle by a pulse from the read counter 11 when the read counter 11 reaches a count of thirty. While the window counter 18 is counting to nineteen, a flip-flop 27 which was set to the "ONE" state by the output from the AND gate 26, remains set to the "ONE" state. When the window counter 18 completes its count to nineteen, it provides a reset pulse to the flip-flop 27 via a conductor 28. The output from the address comparator 24 indicative of the equality of its inputs was permitted to pass through the AND gate 26 because at the time of equality the AND gate 26 was receiving a second input from the flip-flop 27 via conductor 29. In other words, during the time that the flip-flop 27 is in its reset state, the AND gate 26 is opened. However, the pulse through the AND gate 26 sets the flip-flop 27 which results in the AND gate being disabled until the window counter 18 reaches the count nineteen at which time it resets the flip-flop 27. During the time that the flip-flop 27 is in the set state, that is, while the window counter 18 is counting to nineteen after being reset by the output from the address comparator, the AND gate 17 is enabled to pass the output from the delay line 16 to the recognition circuitry 60. When the counter 18 reaches nineteen in its count, twenty rows of data (the selected window) have been gated through and the flip-flop 27 is reset until an equality signal is again generated by the comparator 24. The output of the flip-flop 27 may also be utilized to control the shift action of recognition shift registers to allow shifting only during the time the data is being gated into the shift registers of the recognition circuitry.

Since the delay line 16 has a delay time which is an integral number of read mode scans, its output is always in phase with the read counter 11 and therefore, the window counter 18. As was seen, the count states of the window counter 18 are in synchronism with the segments of data rows currently issuing out of the delay line 16.

Bottom window edge position data contained in the print edge detector 12 is transferred to the window encoder register 20 via conductor 21 at two possible times. If at least five successive black scans, that is, scans containing some dark information, are followed by an all white scan or clear column, a signal is provided on conductor 30 which effects the transfer and at the same time, resets the print edge detector 12. Alternately, when a maximum of ten successive black scans or some other selected maximum (depending on the pitch of an average character) have taken place without an intervening white scan, transfer of position data and resetting of the print edge detector 12, is caused by another pulse on the conductor 30.

A limit counter 31 having a count range from 1 to 11 is initiated by either a real or a synthetic new black signal. It limits the times when information may be transferred into the window encoder register 20. After initiation, once each cycle of the read counter 11, if a black pulse has been sensed, a count pulse is applied to the limit counter 31 via conductor 54 connected to the output terminal of the AND gate 35. These pulses are counted up to a maximum of 11 by the limit counter 31. Of course, as will be seen, the limit counter 31 may be reset by a real new black signal before its count reaches 11. When the limit counter 31 reaches a count of 11, it is reset by a synthetic new black signal from the OR gate 38. If the new black signal is real, it occurs during the next read scan that detects black (part of a character) after a white signal or clear column, that is, a scan detecting no black. If synthetic, the new black signal occurs after the limit counter 31 has counted 11 without an intervening real new black signal.

A flip-flop 32 is set by the first video black signal from AND gate 15 occurring during a read scan and reset by a pulse on a conductor 33 from the read counter 11 after the counter 11 reaches a count of 31, for each read scan cycle. The conductor 33 also serves as an input terminal to each of AND gates 34 and 35. The second input terminal to AND gate 34 is provided by the reset output terminal of the flip-flop 32 while the second input terminal to the AND gate 35 is provided by the set output terminal of the flip-flop 32. The output terminal of AND gate 34 serves as the reset input terminal to a flip-flop 36 while the output terminal of the AND gate 35 serves as the set input terminal to the flip-flop 36.

An AND gate 37 has one of its input terminals connected to the output terminal of the AND gate 35 and its other input terminal connected to the "ZERO" output terminal of the flip-flop 36. Coincident inputs on the input terminals of the AND gate 37 is indicative of a real new black signal. During such a coincidence the AND gate 37 provides a pulse to the limit counter 31 via OR gate 38 which reinitiates or resets the limit counter 31 which then begins a new count.

The limit counter 31 has an output terminal 39 connected as one of the input terminals of AND gate 40. Thus, when and if the limit counter 31 is permitted to reach a count of 11 (no intervening real new black signal) a pulse is provided at the count of 11 on the conductor 39. The conductor 33 from the read counter 11 serves as the second input terminal to the AND gate 40.

The limit counter 31 and the read counter 11 are, of course, synchronized, that is, the limit counter is reset only on the count of 31 by the read counter 11. Thus, when the limit counter 31 reaches the count of 11 and the conductor 33 has a pulse indicative of the read counter 11 reaching a count of 31, the AND gate 40 provides an output signal (the synthetic new black signal) which resets the limit counter 31.

The limit counter 31 is reset by a signal on line 51 only at the end of a scan cycle when the read counter 11 reaches a count of 31. This reset signal may be generated by the occurrence of a new black scan signal indicating the presumed beginning of a new character or by a synthetic new black scan signal. These two reset signals are combined onto line 51 by OR gate 38. The new black scan signal indicates the occurrence of an all white scan followed by a scan containing at least one bit of dark data. This condition is indicated by flip-flop 36 being in the "ZERO" state, signifying the first scan was an all white scan; and flip-flop 32 being in the "ONE" state signifying that the last scan contained black. This condition is sampled at the end of a scan cycle by the action of AND gates 35 and 37. It should be noted that AND gate 35 may simultaneously provide input signals to flip-flop 36 and AND gate 37 and not create a time race because this flip-flop and all other flip-flops of the system are in transition only at times corresponding to the trailing edges of the common clock pulses applied to all of the flip-flops.

Where the character data being scanned has a fixed and known pitch (measurable by the number of scans required to encompass the character) other than the pitch assumed in the previous description, a switch may be provided in line 39 and operated to connect a special output from limit counter 31 to AND gate 40 via line 39. If, due to noisy data, the white scans between characters cannot be detected, then at a count equal to the character pitch (which exceeds the character width) the limit counter special output is conducted to AND gate 40 where at the end of corresponding scan cycle a synthetic new black scan signal is generated and sent onto line 51 via OR gate to reset the limit counter.

The limit counter 31 has an output conductor 41 on which is provided a pulse each time the limit counter reaches the count of five and on each count thereafter, up to a selected maximum (selected to be nine in the present description). This conductor 41 serves as one input terminal to the AND gate 42. The output terminal of the AND gate 34 is connected to and serves as the second input terminal to the AND gate 42. When the flip-flop 32 is in the reset state, and the read counter 11 reaches a count of 31, the AND gate 34 is enabled, indicative of an all white scan, and provides an input to the AND gate 42. When this input to the AND gate 42 is present and the limit counter 31 has reached a count of five or more, up to and including nine, the AND gate 42 produces a pulse on the conductor 30 through the OR gate 43. If the output occurs at a time after there have been five or more up to and including nine successive black scans, the address in the print edge detector 12 is transferred to the window encoder register 20 for temporary storage therein, while at the same time, the print edge detector 12 is reset to receive new video information via conductor 14. The significance of the limit counter reaching a count of five or more is that at least 5 consecutive scans containing line (dark) information have occurred. This requirement provides noise immunity since black scans following all white scans cause the limit counter to reset to "ZERO" through the effect of AND gate 37.

Similarly, on the tenth successive black scan the limit counter 31 provides a decoder input pulse to the AND gate 44 via conductor 45. The conductor 33 from the read counter 11 which has a pulse each time the read counter reaches a count of 31 serves as the second input terminal to the AND gate 44. Thus, it is obvious, that after the limit counter has reached the count of ten (counting the number of scans containing line information via pulses on line 54), the AND gate 44 on the thirty-first count of the read counter in that particular cycle provides a pulse to the conductor 30 through the OR gate 43 which transfers the encoded data from the print edge detector circuit 12 to the window encoder register 20 and at the same time, resets the print edge detector 12. Thus, a transfer of data from edge detector 12 is made in the blank interval following each new character and if no blank interval can be located between characters, the transfer is automatically made following the scan estimated to be the last scan containing character information. For example, in this description the transfer is made automatically on the tenth successive scan detecting black. Therefore, an up to date binary number representative of a new window suitable for the character just scanned is stored and ready for insertion into window address register 22.

However, the encoded data in the encoder register 20 must be stored there and not inserted into the address register 22 until the data emerging from the delay line 16 is actually the data to which the window address computation applies. New addresses are loaded into the window address register 22 under the control of counters 46 and 47 which define the fixed period of time required for data to pass through the delay line 16. To take care of the possibility that up to two complete characters may be stored in the delay line 16 (which has a storage time equal to the time it takes to make thirteen read scans) the delay line counters 46 and 47 are utilized. As will be seen, delay line counters 46 and 47 function to cause the binary encoded information in the encoder register 20 to be inserted into the address register 22 at the appropriate time. It will be remembered that the address register 22, window counter 18 and the address comparator 24 function to actuate the selected window time interval during which time the AND gate 17 is enabled.

The new black signal from the OR circuit 38 is connected to the delay line counters 46 and 47 by means of a conductor 49. The conductor 49 is also connected to the set and reset input terminals of a flip-flop 48. Successive pulses on the conductor 49 cause the flip-flop 48 to complement. The reset output terminal of the flip-flop 48 is connected to the delay line counter 46 while the set output terminal of the flip-flop 48 is connected to the delay line counter 47. Flip-flop 48 selects the two counters alternately. The conductor 33 from the read counter 11 is connected to the delay line counters 46 and 47 and the pulse on the conductor 33 which occurs on the thirty-first count by the read counter at the end of each scan causes the selected one of the delay line counters 46 or 47 to be incremented by one count up to a maximum of fifteen counts at which count it stops, indicating the leading edge of a new character. Each new black signal provided on the conductor 49 causes the flip-flop 48 to change state. If the flip-flop 48 is in the reset state, the first new black signal appearing on the conductor 49 causes the flip-flop 48 to change to the "ONE" state thereby activating the delay line counter 47. Similarly, the next occurring new black signal resets the flip-flop 48 thereby activating the delay line counter 46.

The new black signal applied via the conductor 49 not only changes the state of the flip-flop 48 but at the same time resets the particular delay line counter 46 or 47 which is being activated at that time. The output terminal of the delay line counter 46 is connected as an input terminal to the AND gate 50. The output terminal of the delay line counter 47 is connected as an input terminal to the AND gate 61. The AND gates 50 and 61 have their respective second input terminals connected to the read counter 11 via the conductor 19 which as aforesaid, provides a pulse each time the read counter 11 reaches the count of thirty.

Thus, when for example, the delay line counter 47 has counted up to eleven, (which effectively defines for the delay line data a time interval of 13 scans) then following the thirteenth count by the read counter 11, and near the end of the twelfth scan, the AND gate 61 via the OR gate 52 provides a transfer pulse to the address register 22 thereby causing the encoded binary number stored in the window encoder register 20 to be inserted into the window address register 22. Then on the thirteenth scan a new window position is defined utilizing the new information in the window address register 22 which as heretofore explained, gates the AND gate 17 for a selected twenty row sub-set of a possible thirty rows. Similarly, after the delay line counter 46 reaches the count of eleven, and after the read counter 11 reaches the count of thirty, the AND gate 50 via the OR gate 52 provides an up-date pulse to the window address register 22.

After a first delay line counter 46 or 47 has been selected it will commence counting read scans and will continue to count while a second new black scan initiates counting action by the other delay line counter. It is only on the third successive occurrence of a new black scan signal that said first counter is reset and restarted. By this means the two counters can accommodate data with a minimum pitch of 6 scans (characters 5 scans wide). If successive new black scans are not detected, a selected counter will count up to a maximum of 15 and thereupon rest in this state until selected and reset by the control circuitry initiated by new black scan data.

Thus, data which has been preceded by a new black signal has had a window position computed which is ready to gate the data through the AND gate 17 as it emerges from the delay line 16 assuming of course, that the character width is at least some minimum assumed herein to be five scans. This limitation of five scans exists because no new information is transferred between the print edge detector 12 and the window encoder register 20 until at least five successive scans containing black occur followed by a white signal or clear column. Of course, there is an automatic transfer of data between print edge detector 12 and the window encoder register 20 following the maximum number of successive black scans which maximum has for purposes of presentation been chosen as ten. The data transfer into the window address register 21 is enabled following the count of eleven of either of the delay line counters 46 and 47 to effect register updating at the thirteenth scan time as aforesaid because an initial scan time is taken before generating the new black signal which starts a delay line counter and the thirteenth scan time is accounted for by generating the window address register transfer signal at the very end of the period defined by the twelfth scan time.

Up-dating the window address register 22 does not take place until a time after the occurrence of a new black signal from the OR gate 38 equal to the delay of the delay line 16 and may never take place if neither of the delay line counters 46 and 47 reach a count of 11.

The binary number contained in the window encoder 20 which is essentially changed for each character scanned may also be used to provide an output or Y correction to the scanning system to raise or lower the point of initiation of each scan to adjust the scan itself for misaligned characters and especially for a tilt of the print line. Thus, when the selected window is at either extreme of its range, at the completion of an all white scan, a correction in real time can be made at the scanner to increment its vertical scan position in a direction to move the window away from its extreme position. In the present embodiment the vertical correction is simply an adjustment of the scanner vertical position defining element (counter) corresponding to two matrix rows each time a correction is made. An obvious implication of the teaching of this invention is a continuous correction procedure whereby at each all white scan an incremental correction is made which is directly encoded from the selected window defined by either the print edge detector 12 or the window encoder register 20. For this mechanization there may be a particular window address which would be associated with a zero correction increment.

The various elements which comprise the present combination may be conventional, for example, the encoder register 20, the address register 22 and the address comparator 24 are all well-known computer components.

The counters 11, 18, 31, 46 and 47 may be binary counters whose number of stages or flip-flops is determined by the maximum count desired.

As is well-known binary counters may provide pulses at a selected count simply by providing for each desired pulse an AND gate (or its equivalent) with as many input terminals as there are stages of the counter. Thus, as is well-known, a 5 stage counter with its stages appropriately connected to a 5 input AND gate can be connected to provide an output at any particular counter state from zero to thirty-one.

Figure 3:
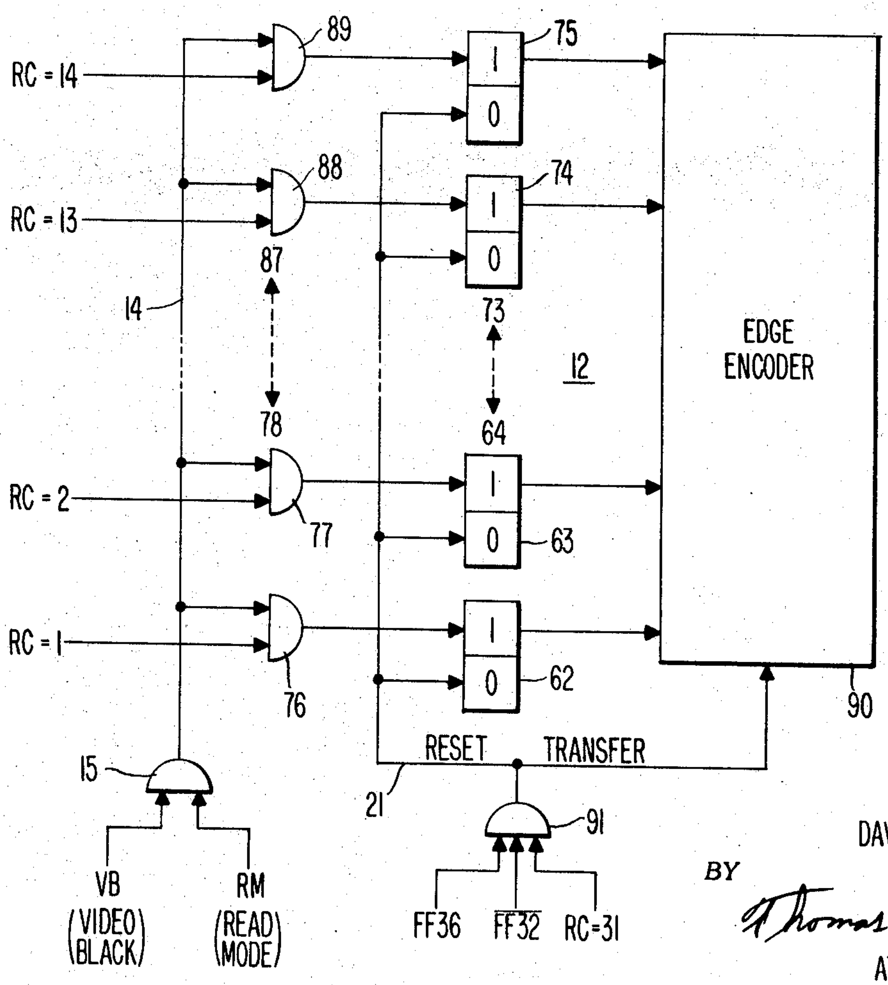
FIG. 3 illustrates in block diagram form, a print edge detector of the type used in the present invention.

Referring now more particularly to FIG. 3, there is shown in somewhat more detail the print edge detector 12 of FIG. 2. The print edge detector 12 comprises fourteen flip-flops 62–75. Each of the flip-flops 62–75 has its set input terminal connected to the output terminal of an AND gate 76–89, respectively. In order to present a simpler drawing only four flip-flops 62, 63, 74 and 75 and four AND gates 76, 77, 88 and 89 are actually shown.

One of the inputs to each of the AND gates 76–89 is provided by the AND gate 15 via conductor 14. The other input to each of the AND gates 76–89 is provided by the read counter 11. During each read scan the AND gates 76–89 successively receive enabling signals each one count period wide from read counter 11.

The set output terminals of each of the flip-flops 62–75 are connected to an edge encoder 50 to be explained more fully hereinbelow.

The flip-flops 62–75 are reset each time a new white scan is detected. The new white scans are detected by an AND gate 91. The black or white condition of each current scan is provided by the flip-flop 32 while the black or white conditions of the previous scan is stored by the flip-flop 36. By appropriate connecting means the new white scan condition of these flip-flops is provided as inputs to the AND gate 91. The read counter 11 provides an enabling signal to the AND gate 91 at the end of each scan, i.e., on the count of 31. At this time when a new white scan is completed each of the flip-flops 62–75 are reset by the output from the AND gate 91.

During each read scan associated with a character, the AND gates 76–89 successively receive enabling signals from the read counter 11. For example, at the count of 1 by the read counter 11 the AND gate 76 alone is enabled, at the count of two AND gate 77 is solely enabled and so on. Thus, at each of the first fourteen counts of the read counter 11 a particular AND gate 76–89 is enabled so that if a video black pulse has been generated by the scanner system 10 at one or more of the counts the corresponding AND gates set their associated flip-flops. This continues for each scan associated with a character, i.e., before a new white scan until the accumulated set and reset conditions of the flip-flops 62–75 provide information definitive of the lowest edge of the character scanned. At the end of the character, the flip-flops are cleared in readiness for the next character by the trailing edge of the reset pulse from the AND gate 91 which is used to transfer the binary number representative of the lowest two adjacent set flip-flops into the window encoder register 20 after encoding in the edge encoder 90.

The edge encoder 90 senses the lowest two adjacent flip-flops, 62–75, which are in the set state and converts the condition into the binary number representative of the lowest window position which is transferred to the encoder register 20 and thence to the window address register 22. The edge encoder 90 encodes the two lowest adjacent flip-flops which are representative of the two lowest adjacent rows containing black video information into a four bit binary number according to the following table:

| Lowest row pair | Window position |
|---|---|
| rows **1** and **2** | 0 or binary No. 0000 |
| rows **2** and **3** | 0 or binary No. 0000 |
| rows **3** and **4** | 0 or binary No. 0000 |
| rows **4** and **5** | 0 or binary No. 0000 |
| rows **5** and **6** | 1 or binary No. 0001 |
| rows **6** and **7** | 2 or binary No. 0010 |
| rows **7** and **8** | 3 or binary No. 0011 |
| rows **8** and **9** | 4 or binary No. 0100 |
| rows **9** and **10** | 5 or binary No. 0101 |
| rows **10** and **11** | 6 or binary No. 0110 |
| rows **11** and **12** | 7 or binary No. 0111 |
| rows **12** and **13** | 8 or binary No. 1000 |
| rows **13** and **14** | 9 or binary No. 1001 |
| row **14** alone | 10 or binary No. 1010 |

The first four adjacent pairs of rows require window position 1 while the required window positions for the remaining adjacent pairs progressively go up to 10. If, for example, rows 7 and 8 are the lowest adjacent rows which are detected containing black video, the binary number 0011 (window position number 3) is transferred into the encoder register 20 and the gate 17 is opened for a count of 20 when the window counter 18 reaches a binary count of 0011. The gate 17 will be opened at the same count for the video provided by all the scans associated with the character. Gate times for the following characters are computed after new white scan times when the flip-flops 62–75 are reset.

The function of the edge encoder 90 then is to detect the lowest two adjacent flip-flops 62–75 which are in the set condition and convert that condition into the appropriate binary number. One arrangement for accomplishing the foregoing function is to provide an AND gate for each possible pair of adjacent flip-flops. The outputs of the AND gates are then strobed to detect the first (or lowest) one having an output signal. The output of the selected AND gate would then be converted to the binary number appropriate to its position by conventional encoding means.

Figure 4:
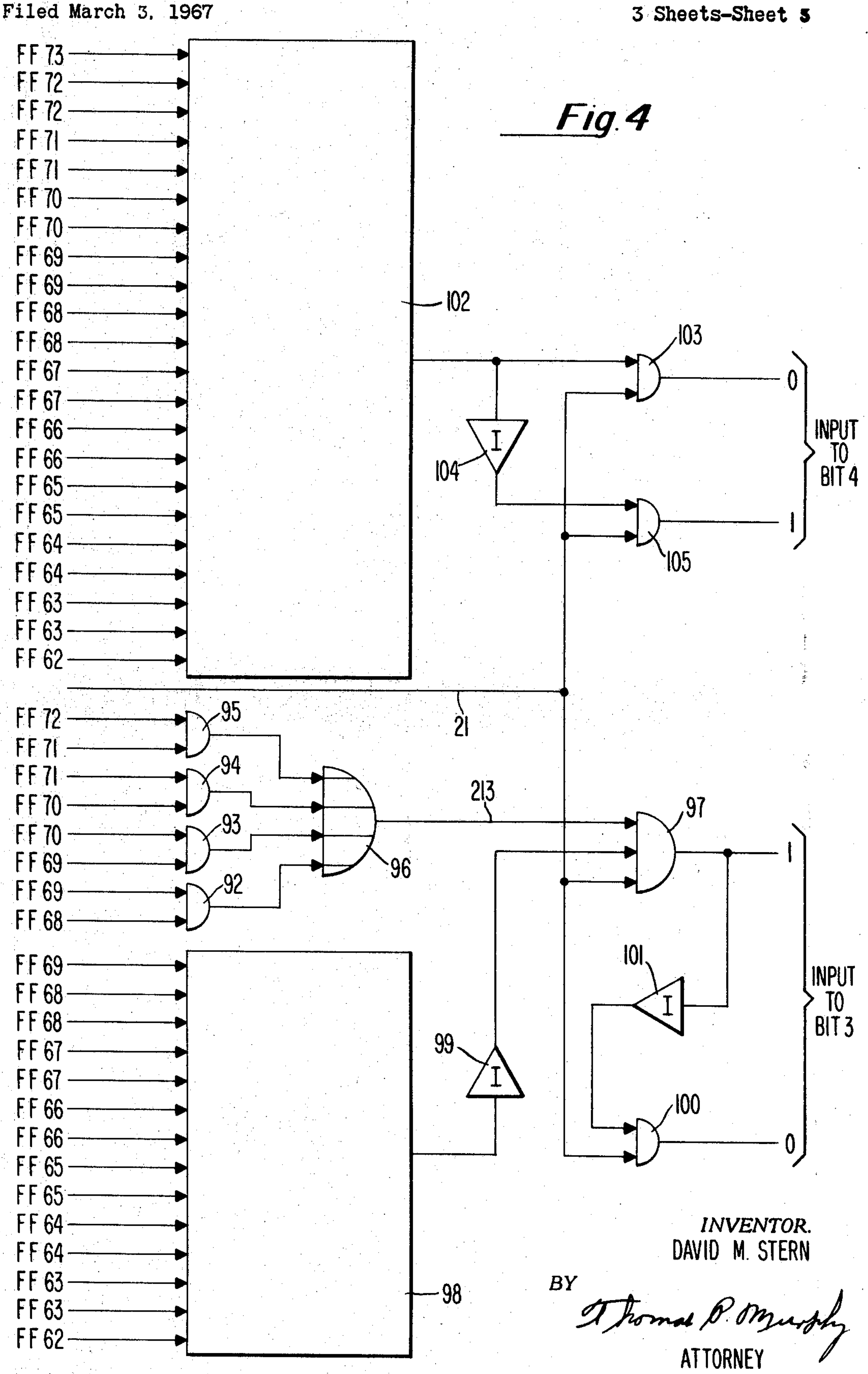
FIG. 4 shows in more detail the selected window encoder logic of the type used in the print edge detector.

FIG. 4 illustrates the portion of the parallel logic of the edge encoder 90 which is actually used to generate the signals for loading bits 3 and 4 of the four bit window position number into the window encoder register 20.

AND gates 92, 93, 94 and 95 are connected to receive, respectively, the outputs from the flip-flops 68, 69, 69 and 70, 70 and 71, 71 and 72. If any pair of these pairs of flip-flops are set, the associated AND gate 92, 93, 94 or 95 is enabled. The output terminals of each of the AND gates 92, 93, 94 and 95 are connected to the OR gate 96 whose output terminal serves as an enabling signal for the AND gate 97 over conductor 213. If any one, some or all of the AND gates 92, 93, 94 and 95 are enabled, a "1" is transferred to the third bit position in the encoder register 20 at the end of scan time when a new white enabling pulse is provided at the AND gate 97 via conductor 21, from AND gate 81. It is, of course, desired to have a "1" in the third bit position only when the window number is 4, 5, 6 or 7 and the above-described arrangement provides this "1."

The lowest row position 1, and 2, 2 and 3, 3 and 4, 4 and 5, and 5 and 6, 6 and 7, or 7 and 8 requires a "zero" in the third bit position. This is accomplished by providing an AND-OR circuit 98 similar to that described above. The AND-OR circuit contains an AND gate for each pair of row positions which in this case amount to seven AND gates each receiving inputs from pairs of the flip-flops 62, 63, 64, 65, 66, 67 and 68. When any adjacent pair of these flip-flops are in the set condition the AND-OR circuit has an enabled output. The output terminal is connected via an inverter 99 as an input terminal to the AND gate 97. When the output of the AND-OR circuit 98 is enabled, AND gate 97 is inhibited and cannot produce an enabled output signal. The output terminal of the AND gate 97 is connected as one input terminal to an AND gate 100 via an inverter 101. Conductor 21 provides the second input terminal to the AND gate 100, which therefore, on a new white signal occurring when the output of the AND-OR circuit 98 is enabled, causes a "0" to be transferred to the third bit position within the encoder register 20.

The transfer of a "1" into the fourth bit position within the window encoder register 20 is accomplished in a similar fashion. An AND-OR circuit 102 contains eleven AND gates since there are 11 row pairs below those pairs specifying a "1" in bit 4 position. Each AND gate has its output terminal connected to the OR gate which provides the output of the AND-OR circuit 102. Row positions 1 and 2, 2 and 3, 3 and 4, 5 and 5, 6 and 7, and 8, 9 and 10, 11 and 12, all require a "0" in the fourth bit position while only row positions 12 and 13, 13 and 14 and 14 and 15 require a "1" in that position. Therefore, adjacent pairs of the flip-flops 62–72 and respectively connected to the eleven AND gates within that AND-OR circuit 102 which is enabled when any adjacent pair of the flip-flops 62–72 are in the set condition.

The output terminal of the AND-OR circuit 102 serves as one input terminal to an AND gate 103 and via an inverter 104 as one input to the AND gate 105. The second input to each of AND gates 104 and 105 is provided by the transfer signal from AND gate 91.

When black is encountered at any row pairs 1 and 2 through 11 and 12, the AND-OR circuit 102 is enabled. A transfer pulse on the conductor 21 then causes the AND gate 103 to transfer a "0" to the fourth bit position in the encoder register 20.

When no black is encountered at these two pairs, the output of the AND-OR circuit 102 is not enabled. Therefore, because of the presence of the inverter the AND gate 105 transfers a "1" to the fourth bit position when a transfer pulse is present on the conductor 21.

In a manner similar to that just described with respect to bit positions 3 and 4, a "1" or a "0" are loaded into bit positions 1 and 2 within the encoder register 20. The requirements for bit positions 1 and 2 relative to row pair positions may be seen in the above set forth table.

What is claimed is:

1. A circuit for use during the read mode in a character recognition system wherein each character is scanned a plurality of times to provide the video information associated with the character, comprising in combination:

- a scanning system providing the black and white video information associated with each scan of the character,
- logic circuitry adapted to receive said black and white video information to recognize individual characters with which said information is associated,
- gates means connected between said scanning system and said logic circuitry, said gate means being normally closed to said video,
- control means connected to said gate means opening said gate means to a selected portion of said video associated with each scan of a character,
  - said control means including:
  - detector means connected to said scanning system for determining the specific position at which black video is encountered during the scanning of the character, and
  - circuit means connected to said detector means and said gate means providing gating pulses of predetermined duration during each of the scans associated with said character, which pulses are initiated for each of the successive scans associated with said charater at the same relative position during each of said successive scans, said relative positions being scanned at a time earlier than the time of the scan of said specific position.

2. A circuit according to claim 1 wherein said circuit means comprises:

- edge encoder means connected to said detector means for converting said relative position into a binary number,
- a bindary counter
- first means resetting said binary counter at the start of each scan,
- second means connected between said edge encoder means and said binary counter resetting said binary counter when said binary number equals the count of said binary counter,
- third means connected to said second means to initiate said gating pulse when said binary counter is reset by said second means,
- fourth means connected to said binary counter and said third means terminating said gating pulse when said binary counter reaches a predetermined count.

3. A circuit according to claim 2 wherein said second means comprises:

- first storage means connected to said edge encoder means for storing said binary number,
- a second storage,
- comparator means connected between said second storage and said binary counter providing an output pulse when the count by said binary counter and said binary number are equal.

4. A circuit according to claim 3 wherein said comparator means includes,

- conductor means connected to said binary counter and said gate means whereby said output pulse resets said binary counter and effects opening of said gate means.

5. A circuit according to claim 4 wherein said third means comprises:

- a flip-flop having its set output terminal connected to said gate means and set by said output pulse from said comparator means
- said flip-flop providing said gating pulse on its set output terminal as long as said flip-flop is in its set condition.

6. A circuit according to claim 5 wherein said fourth means comprises:

- conductor means connected between said binary counter and said flip-flop providing a reset pulse to said flip-flop when said binary counter reaches a predetermined count after being reset by said output pulse from said comparator means.

7. A circuit according to claim 3 further including:

- means connected to said first storage means for transferring said binary number from said edge encoder means into said first storage means after a minimum predetermined number of scans detecting black video have occurred followed by a scan detecting no black or after a maximum predetermined number of scans detecting black video.

8. A circuit according to claim 3 further including:
means connected to said second storage means for transferring said binary number in said first storage means into said second storage means a selected time after occurrence of a scan detecting black video preceded by a scan detecting no black video.

9. A circuit according to claim 7 further including:
means connected to said second storage means for transferring said binary number in said first storage means into said second storage means a selected time after occurrence of a scan detecting black video preceded by a scan detecting no black video.

10. A circuit according to claim 9 further including:
delay means connected between said scanning system and said gate means having a time delay equal to said selected time.

11. A circut according to claim 6 further including:
means connected to said second storage means for transferring said binary number in said first storage means into said second storage means a selected time after occurrence of a scan detecting black video preceded by a scan detecting no black video.

12. A circuit according to claim 11 further including:
delay means connected between said scanning system and said gate means having a time delay equal to said selected time.

13. In a circuit which provides a gating pulse during a selected portion of each of the scans associated with each character read by a character recognition system,
optical scanning means providing the black and white video information associated with each scan of a character,
means providing an output pulse indicative of black video encountered during a scan preceded by a scan in which no black video was encountered,
said means including,
a first AND gate,
a flip-flop having its reset output terminal connected as an input terminal to said first AND gate providing said first AND gate with an input signal at the end of each scan containing no black video,
logic circuitry connected to said optical scanner and having an output terminal connected as the set input terminal of said flip-flop and as an input terminal of said first AND gate providing an output at the end of each scan containing black video,
whereby said first AND gate provides an output for each scan containing all white video followed by a scan containing black video,
a second AND gate,
means providing said second AND gate with an input at the end of each scan,
limit counter means connected to said second AND gate providing said second AND gate with an input after a predetermined count,
OR gate means connected to said limit counter means for providing an output to reset said limit counter means,
said OR gate means connected to the output terminals of said first and second AND gates whereby said limit counter is reset when either said first or second AND gates have an output,
first and second counters alternately activated to provide an output a predetermined time after being reset, and
conductor means connecting said OR gate to said first and second counters for providing an output for alternately resetting and activating said first and second counters.

14. A circuit for use during the read mode in a character recognition system wherein each character is scanned a plurality of times to provide the video information associated with each character, comprising in combination:
a scanning system providing the black and white video information associated with each scan of a character,
logic circuitry adapted to receive said black and white video information to recognize a character with which said information is associated,
a normally closed gate connected between said scanning system and said logic circuitry,
a delay line connected between said scanning system and said gate, and
control means connected to said gate opening said gate for a selected portion of said video associated with each scan of a character as said video emerges from said delay line, said selected portion starting at a position before the sensing of a character.

15. A circuit according to claim 14 wherein said control means comprises:
detector means connected to said scanning system determining the lowest posoition at which black video is encountered during the scanning of a character,
edge encoder means included within said detector means for converting a position before said lowest position into a binary number,
binary counter means defining the row segments of each scan normally reset at the start of each scan,
first means connected between said edge encoder means and said binary counter resetting said binary counter when its count equals said binary number,
second means connected to said first means and said gate means responsive to the resetting of said binary counter by said first means to provide a gating pulse to said gate means,
third means connected to said binary counter and said second means terminating said gating pulse when said binary counter reaches a predetermined count.

16. A circuit according to claim 15 further including:
first storage means,
means for transferring the binary number contained in said detector means into said first storage means, said means comprising:
a limit counter to said scanning system for counting scans containing black video,
logic circuit means connected to said scanning system providing a pulse for resetting said limit counter when a scan containing black video follows a scan containing white video,
means connected to said limit counter and said logic circuit providing a pulse to said detector means and said first storage means clearing said detector means and transferring the binary number in said detector means to said first storage means after said limit counter has counted a first predetermined number of scans containing black video followed by a scan containing white video or after a second predetermined number of scans larger than said first predetermined number each containing black video,
said detector means including means for determining when the lowest position at which black video is encountered in an extreme position relative to the scan.

17. A circuit according to claim 16 wherein said first means further comprises:
second storage means connected to said first storage means for storing said binary number,
comparator means connected between said second storage means and said binary counter providing an output pulse when the count by said binary counter and said binary number are equal.

18. A circuit according to claim 17 further including:
timing means connected to said second storage means for inserting said binary number from said first storage means into said second storage means a predetermined time after said first scan at which black video is encountered, said predetermined time being equal to the delay time of said delay line.

19. A circuit according to claim 2 wherein said edge encoder means comprises:

segmented storage means for accumulating the presence of signal data on a row by row basis, gating means for entering signal data into successive segments of said storage means, gating means for encoding the position of the data accumulated in said storage means into a binary position number.

References Cited

UNITED STATES PATENTS

| | | | |
|---|---|---|---|
| 3,350,505 | 10/1967 | Bakis | 340—146.3 |
| 3,295,105 | 12/1966 | Gray et al. | 340—146.3 |
| 3,302,174 | 1/1967 | Djinis et al. | 340—146.3 |
| 3,346,845 | 10/1967 | Fomenko | 340—146.3 |

THOMAS A. ROBINSON, Primary Examiner